UNITED STATES PATENT OFFICE.

JACOB REESE, OF PITTSBURG, ASSIGNOR TO THE STEEL PATENTS COMPANY, OF PHILADELPHIA, PENNSYLVANIA.

BASIC LINING.

SPECIFICATION forming part of Letters Patent No. 499,248, dated June 13, 1893.

Application filed September 24, 1885. Serial No. 178,088. (No specimens.)

*To all whom it may concern:*

Be it known that I, JACOB REESE, a citizen of the United States, residing at Pittsburg, in the county of Allegheny and State of Pennsylvania, have invented a certain new and useful Improvement in Basic Linings for Metallurgical Furnaces; and I hereby declare the following to be a full, clear, and exact description thereof, which will enable others skilled in the art to make and use the same.

Heretofore basic linings have been made of calcarious material or of oxide of iron or alumina. Furnaces used for conducting the puddling or boiling processes are generally lined with oxide of iron as the temperature does not exceed 2,500° Fahrenheit, but for furnaces in which the metal is held in a fluid state after conversion, the temperature ranges from 4,000° to 5,000° Fahrenheit, and calcareous linings have been generally used.

I have discovered that carbonate of magnesia when burned at a high temperature becomes hardened and indurated and when so prepared and mixed with carbonaceous matter, it may be rammed into a lining or into brick forms, and the lining or bricks burned; that a lining so made by ramming or of bricks will serve as an excellent basic lining for conducting the dephosphorizing process in.

In carrying out my invention, I take carbonate of magnesia, which is as pure as possible, and which when burned will contain not less than fifty per cent., nor more than sixty per cent. of magnesium. I then burn this carbonate of magnesia until the carbon dioxide is eliminated, and the magnesia is hardened and indurated. The magnesite is then mixed with carbonaceous matter such as tar or asphaltum, and molded into brick, or rammed into the form of a lining. The brick or lining is then subjected to a gradually increasing temperature until a high heat is attained, sufficient to glaze the lining material, when it is ready for use.

When molten phosphoric iron is blown with an air blast while in a magnesia lined vessel, and in the presence of a calcareous basic bath until the silicon and carbon are eliminated, and the blow is then continued the phosphorus will be removed from the metal to the slag, and the metal cleansed from phosphorus and other impurities.

The basic bath may be composed of lime or magnesite, or a mixture of magnesite and lime. The amount of basic addition should not be less than six (6) times the weight of the silicon and phosphorus in the metal.

What I claim as my invention, and desire to secure by Letters Patent, is—

1. Linings for metallurgical furnaces or converters, which consist of a highly burned indurated magnesia containing not less than fifty per cent., nor more than sixty per cent. of magnesium, and an anhydrous binding agent.

2. The mixture of highly burned indurated non-calcareous magnesia and tar as a compound for the manufacture of furnace linings.

3. Linings for metallurgical furnaces or converters which consist of highly burned indurated magnesia and an anhydrous binding agent, said linings being externally vitrified or glazed.

JACOB REESE.

Witnesses:
C. C. LEE,
CHAS. A. ROBB.